Figure 1:
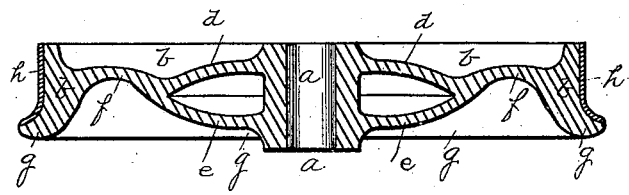

(No Model.)

W. H. MELANEY.
CAR WHEEL.

No. 397,927. Patented Feb. 19, 1889.

Witnesses:
J. M. Cooke
Robt. D. Totten

Inventor.
William H. Melaney
By James D. Kay
Attorney

UNITED STATES PATENT OFFICE.

WILLIAM H. MELANEY, OF PITTSBURG, ASSIGNOR OF ONE-HALF TO ROBERT C. TOTTEN, OF ALLEGHENY, PENNSYLVANIA.

CAR-WHEEL.

SPECIFICATION forming part of Letters Patent No. 397,927, dated February 19, 1889.

Application filed May 19, 1888. Serial No. 274,364. (No model.)

*To all whom it may concern:*

Be it known that I, WILLIAM H. MELANEY, a resident of Pittsburg, in the county of Allegheny and State of Pennsylvania, have invented a new and useful Improvement in Car-Wheels; and I do hereby declare the following to be a full, clear, and exact description thereof.

My invention relates to car and locomotive wheels, its object being to provide a car-wheel which has not only the strength—tensile, torsional, and transverse—of the ordinary steel casting, but has an exceedingly hard facing at the points where the surface of the periphery and flange are submitted to wear. It is a well-known fact that in order to obtain the necessary wearing powers in the car-wheel it has been considered necessary to make these wheels of chilling cast-iron, as in the casting of the wheel the part of the chilling cast-iron which comes in contact with the chill in the mold is so contracted and hardened as to form an exceedingly hard facing on that part of the wheel forming the wearing-surface, and a facing which under ordinary circumstances gives the best wearing properties to the car-wheel, this class of car-wheels having been for many years in almost universal use. There are, however, some very serious objections to these car-wheels, as the iron which will chill or harden as above set forth is necessarily weak and very liable to fracture; and as not only the body of the wheel is formed of this material, but also the body of the tire or rim, including the flange, it often occurs that where the wheel is subjected to a very severe shock, jar, or blow the wheel will break in the rim portion or its flange, the principal breakages occurring in the flange of the wheel, which cannot be made very thick, and, being formed of weak cast-iron, when subjected to heavy strains or jars, which are liable to occur even on the slight misplacing of the track or for some other reason, the flange breaks off and often causes accidents as well as rendering the wheel useless. The principal objection, therefore, in the use of these chilled-iron car-wheels is in the fact that the rim or tire and flange do not possess the required strength and tenacity. To overcome this, wheels have been formed entirely of steel, and these wheels, while having the necessary strength to resist the different strains to which they are subjected, have the serious objection that they lack the desired wearing properties, and under the ordinary running wear on the tracks will not last nearly so long as the ordinary chilled-iron wheel, though the great objections to the chilled-iron wheel have caused some railroads to employ the steel wheel even at the greater expense on account of the inferior wearing properties thereof.

The object of my invention is to provide a wheel in which the advantages of the two wheels above referred to are obtained—namely, the great strength and toughness to resist the shocks, jars, and sudden strains in the tire or rim portions of the wheel, as well as in its body, and the superior wearing properties on the wearing-surfaces thereof; and to these ends my invention consists, generally stated, in a car or locomotive wheel having the tire or rim portion thereof formed of steel and a facing of chilled cast-iron formed on the wearing-surfaces of the tire or rim portion.

It also consists in the car or locomotive wheel having the tire or rim portion thereof and its flange formed of steel and a facing of chilled cast-iron formed on the wearing-surfaces of the tire and its flange.

It also consists in other improvements hereinafter particularly set forth.

To enable others skilled in the art to make and use my invention, I will describe the same more fully, referring to the accompanying drawings, in which—

Figure 2:
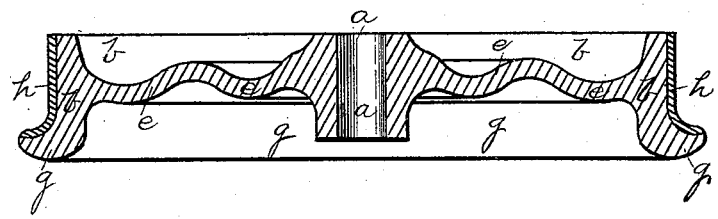
Figure 3:
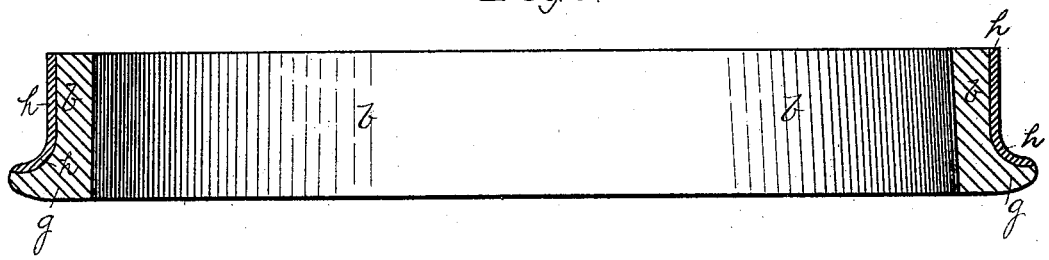

Figures 1 and 2 represent two different forms of car-wheels embodying my invention, and Fig. 3 represents a tire for a locomotive-wheel embodying my invention.

Like letters of reference indicate like parts in each.

My improved wheel may be of any desired form, according as the different manufacturers consider the best form for giving strength or lightness to the wheel, the exact shape of the wheel not forming any part of my invention.

In the car-wheel as shown in Fig. 1 the wheel is formed of the hub $a$ and rim or tire $b$, connected by the plates $d$ $e$, which extend out from the hub $a$, being curved to the shape found to give the greatest strength, and having beyond them the single plate $f$, which unites them to the rim or tire $b$. At the base of the rim or tire $b$ is the flange $g$, this flange extending out beyond the periphery of the tire. These parts of the wheel are formed of steel, a low grade or soft steel being employed for the purpose in order to obtain the desired strength—tensile, torsional, and transverse—to resist the jars, shocks, or strains which are brought upon the wheel-body. For these parts of the wheel it is desirable to obtain a metal as tough and strong as possible, and for that reason I may desire to use and I include under the term "steel" a steel or iron as low or free from carbon as can be properly melted and cast in a mold. On the wearing-surfaces of the tire or rim $b$ and its flange $g$ is the facing $h$ of the chilled cast-iron, this facing being united to the body of the rim and flange by fusion, so as to form practically one solid mass therewith. The chilled cast-iron facing $h$ is made of a thickness suitable for the purpose—such as, say, of one-half ($\frac{1}{2}$) inch or more—and this chilled cast-iron facing is thus supported by the tough and strong steel which forms the body portion of the rim and its flange, to which it is perfectly united. I thus obtain a car-wheel which, while it has the exceedingly hard wearing-surface which can only be obtained by the employment of the chilled cast-iron, and therefore possesses all the wearing properties of the ordinary chilled cast-iron car-wheel, has at the same time all the strength and power to resist strains, shocks, or jars found in the steel wheels, and one in which the chilled cast-iron facing is supported by the steel in the body of the rim or tire and flange, so that practically all liability of breaking of the flange or tire portion of the wheel is overcome, and at the same time the entire body of the wheel outside of the wearing-surface is formed of tough and strong metal, which gives it power to resist the strains by which the ordinary cast-iron wheel is liable to be broken.

In Fig. 2 is shown another and a simple form of car-wheel, this wheel having the single plate $e$, uniting the hub $a$ with the rim or tire $b$, and the flange $g$ and tire $b$, having thereon the chilled cast-iron facing $h$, for the purposes above set forth.

In Fig. 3 is shown a tire for a locomotive driving-wheel embodying my invention, these tires being preferably formed separate from the body of the wheel and shrunken or otherwise secured thereon, and in order to obtain the necessary strength and power to resist strains, shocks, or jars, it has been customary heretofore to employ only steel tires for these wheels, the tires being replaced from time to time as their faces were worn under the peculiarly severe strains brought on the driving-wheels of the locomotive. These locomotive-wheel tires when formed according to my invention have the tire portion $b$ and its flange $g$ formed of the soft or low carbon cast-steel before referred to, and have the facing $h$ of chilled cast-iron on the wearing-surfaces of the tire and its flange, and I am thus enabled in these tires for the driving-wheels to obtain the necessary strength, &c., and at the same time to provide such wheels with a very hard wearing-surface suitable to withstand any wear to which the wheels are subjected, and therefore I increase the life of such tires to double or treble that of the ordinary locomotive-tires.

In forming my improved car or locomotive wheels I take advantage of the fact that the steel is of greater specific gravity than the chilling cast-iron, and in forming the wheel I employ the ordinary mold, except as indicated herein. In such mold the parts are supported in any desired way, the mold being of any desired form and any desired form of chill being employed. I provide the mold with escape-runners leading up from the higher parts of the mold, such as from the upper part of the hub and rim or tire, and in casting the chilling cast-iron is first poured into the mold, entering through the base thereof, as is usual in such castings, and the mold-cavity filled thereby and the chilled facing $h$ formed by contact with the mold-chill, the chilled facing being preferably about one-half inch or more in thickness, the thickness of the facing being regulated by the mixture of chilling cast-iron employed. As soon as the mold is filled with the cast-iron, I pour through the same gate molten steel of proper quality, and as the steel is of greater specific gravity it expels from the mold all the molten or unchilled cast-iron therein, the molten steel raising the molten cast-iron and floating it off through the escape-runners in the top of the mold, and the molten steel filling the entire mold, except that part occupied by the chilled shell or facing $h$, and uniting by fusion with the inner surface thereof.

Instead of pouring the steel through the same runners as the chilling cast-iron, the steel may be poured in the hub portion during the pouring of the cast-iron in the rim portion and the pouring thereof continued after the pouring of the cast-iron ceases, in which case the cast-iron will fill the rim portion and the steel the body portion of the mold, and the steel, flowing forward into the rim portion, will, on account of its greater specific gravity, expel the fluid or unchilled portion of the cast-iron therefrom, thus saving in the labor of pouring and amount of cast-iron employed. The car-wheel so obtained is thus formed of the body and rim or rim and its flange, composed of steel of the desired quality, and a chilled facing on the wearing-surfaces of the rim or rim and flange, as above described. As the molten steel acts to expel the unchilled or molten cast-iron from the mold by displacing the same, it is evident that there is no liability whatever of the oxidation of the inner surface of the chilled facing formed in the mold, and consequently a perfect fusion or union is obtained between the steel and the chilled facing, the chilled facing being thus perfectly united to and supported by the steel rim. In forming this rim or tire for locomotive-wheels such as shown in Fig. 3 the operation is the same, except that the mold for the body portion of the wheel is omitted and the inner face of the tire is given the desired shape or shape best adapted to secure it to the body of the locomotive-wheel.

I thus obtain a car or locomotive wheel having the tire or rim thereof, or such tire with the flange which extends out therefrom, formed of steel, and obtain in these parts all the strength necessary to resist jars or strains, and provide on said rim or rim and its flange a facing of hard chilled iron, which is perfectly united therewith and supported thereby, and as a consequence my improved car-wheel possesses all the wearing properties of the ordinary chilled-iron car-wheel which has been heretofore in almost universal use, together with the strength of the steel car-wheel, not only in the body thereof, but in the tire and flange, and my improved car-wheel has, therefore, all the wearing qualities of the one wheel with the strength of the other.

What I claim as my invention, and desire to secure by Letters Patent, is—

1. A car or locomotive wheel having the rim or tire thereof formed of steel and a facing of chilled cast-iron formed on the wearing-surface of the tire, substantially as and for the purposes set forth.

2. A car or locomotive wheel having the rim or tire and the flange thereof formed of steel and a facing of chilled cast-iron formed on the wearing-surfaces of the tire and flange, substantially as and for the purposes set forth.

3. A car-wheel having the body, the rim or tire, and the flange formed of steel, and a facing of chilled cast-iron formed on the wearing-surfaces of the rim and flange, substantially as and for the purposes set forth.

In testimony whereof I, the said WILLIAM H. MELANEY, have hereunto set my hand.

WILLIAM H. MELANEY.

Witnesses:
   JAMES I. KAY,
   J. N. COOKE.